United States Patent
Wakamatsu

Patent Number: 6,023,501
Date of Patent: Feb. 8, 2000

[54] LEAST COST ROUTING WITH REPEATED SEARCHES FOR LOWER COST ROUTE

[75] Inventor: Takashi Wakamatsu, Tokyo, Japan

[73] Assignee: NEC Corporation, Tokyo, Japan

[21] Appl. No.: 09/261,746

[22] Filed: Mar. 3, 1999

[30] Foreign Application Priority Data

Mar. 3, 1998 [JP] Japan ................... 10-066007

[51] Int. Cl.⁷ .............. H04M 15/00; H04M 7/00
[52] U.S. Cl. ............. 379/114; 379/115; 379/220; 379/221
[58] Field of Search ............ 379/112, 111, 379/113, 114, 115, 121, 127, 128, 219, 220, 221, 67.1, 88.12; 455/405, 406

[56] References Cited

U.S. PATENT DOCUMENTS

| | | | |
|---|---|---|---|
| 5,027,388 | 6/1991 | Bradshaw et al. | 379/114 |
| 5,515,425 | 5/1996 | Penzias et al. | 379/114 |
| 5,606,602 | 2/1997 | Johnson et al. | 379/114 |
| 5,659,601 | 8/1997 | Cheslog | 379/114 |
| 5,675,636 | 10/1997 | Gray | 379/114 |
| 5,748,718 | 5/1998 | Manicone | 379/114 |
| 5,781,620 | 7/1998 | Montgomery et al. | 379/114 |
| 5,790,643 | 8/1998 | Gordon et al. | 379/114 |
| 5,799,072 | 8/1998 | Vulcan et al. | 379/114 |
| 5,802,502 | 9/1998 | Gell et al. | 379/114 |
| 5,915,214 | 6/1999 | Reece et al. | 379/114 |
| 5,930,343 | 7/1999 | Vasquez | 379/114 |

Primary Examiner—Paul N Loomis
Assistant Examiner—Rexford Barnie
Attorney, Agent, or Firm—Young & Thompson

[57] ABSTRACT

In a communications network, a database is searched for a least cost route in response to a call request from a subscriber, and a connection is established along the least cost route between the calling subscriber and a called subscriber. For the duration of the call, the database is repeatedly searched for a route having a cost lower than the cost of a previously determined route. If the route of lower cost is detected, a new connection is established along the lower cost route, instead of the currently established connection.

14 Claims, 4 Drawing Sheets

Switching System

Tariff Database

Switching System

LEAST COST ROUTING WITH REPEATED SEARCHES FOR LOWER COST ROUTE

BACKGROUND OF THE INVENTION

1. Field of the Invention

The present invention relates to a least cost routing technique for a communications network.

2. Description of the Related Art

Least cost routing is a well-known technique which is usually implemented as an integral part of a network or built into a customer-premises equipment. The current least cost routing is performed once at the time a call is originated. However, the cost of the route detected at the time of call origination is not necessarily the minimum cost since criteria for least cost determination are time-varying and hence possibility exists that routes of still lower cost are not available at the call setup time but later made available as the call progresses.

SUMMARY OF THE INVENTION

It is therefore an object of the present invention to provide a least cost routing method whereby attempts are repeated for the duration of a call to find a new route whose cost is lower than the cost of a previous route, which is then replaced with the new route.

According to a first aspect of the present invention, there is provided a method of least cost routing through a communications network. The method comprises the steps of (a) detecting a least cost route through the network in response to a request from a calling subscriber, (b) establishing a first connection along the least cost route for connecting the calling subscriber and a called subscriber, (c) detecting a route through the network, the route having a cost lower than the cost of the route detected by the step (a), and establishing a second connection along the route detected by the step (c) for connecting the calling and called subscribers, instead of via the first connection.

According to a further aspect, the present invention provides a method of least cost routing through a communications network, comprising the steps of (a) making a search through a database for a least cost route in response to a request from a calling subscriber, (b) establishing a connection along the least cost route between the calling subscriber and a called subscriber, (c) making a search through the database for a route having a cost lower than the cost of a previously determined route, (d) if the route of lower cost is detected by the step (c), establishing a connection along the lower cost route, instead of the currently established connection, and (e) repeating the steps (c) and (d).

According to a still further aspect, the present invention provides a communications network which comprises a database for making a first search for a least cost route in response to a request packet and sending a reply packet containing data of the least cost route, and a plurality of network nodes interconnected by communication links, each of the network nodes functioning as an originating node for sending the request packet to the database in response to a call request from a calling subscriber, the originating node being responsive to the reply packet for establishing a first connection along the least cost route determined by the database between the calling subscriber and a called subscriber. The database is arranged to make a second search for a route having a cost lower than the cost of the least cost route, and sending a second reply packet containing data of the route of lower cost. The originating node is responsive to the second reply packet for establishing a second connection along the route of lower cost, instead of the first connection.

According to another aspect of the present invention, there is provided a communications network comprising a central database for holding tariff data and producing a search program based on the tariff data, and a plurality of network nodes interconnected by communication links, each of the network nodes comprising a local database and functioning as an originating node for making a first search through the local database for a least cost route in response to a call request from a calling subscriber using the search program, and establishing a first connection along the least cost route between the calling subscriber and a called subscriber. The originating node is arranged to make a second search through the local database for a route having a cost lower than the cost of the least cost route using the search program and establishing a second connection along the route of lower cost, instead of the first connection.

BRIEF DESCRIPTION OF THE DRAWINGS

The present invention will be described in further detail with reference to the accompanying drawings, in which.

DETAILED DESCRIPTION

Figure 1:
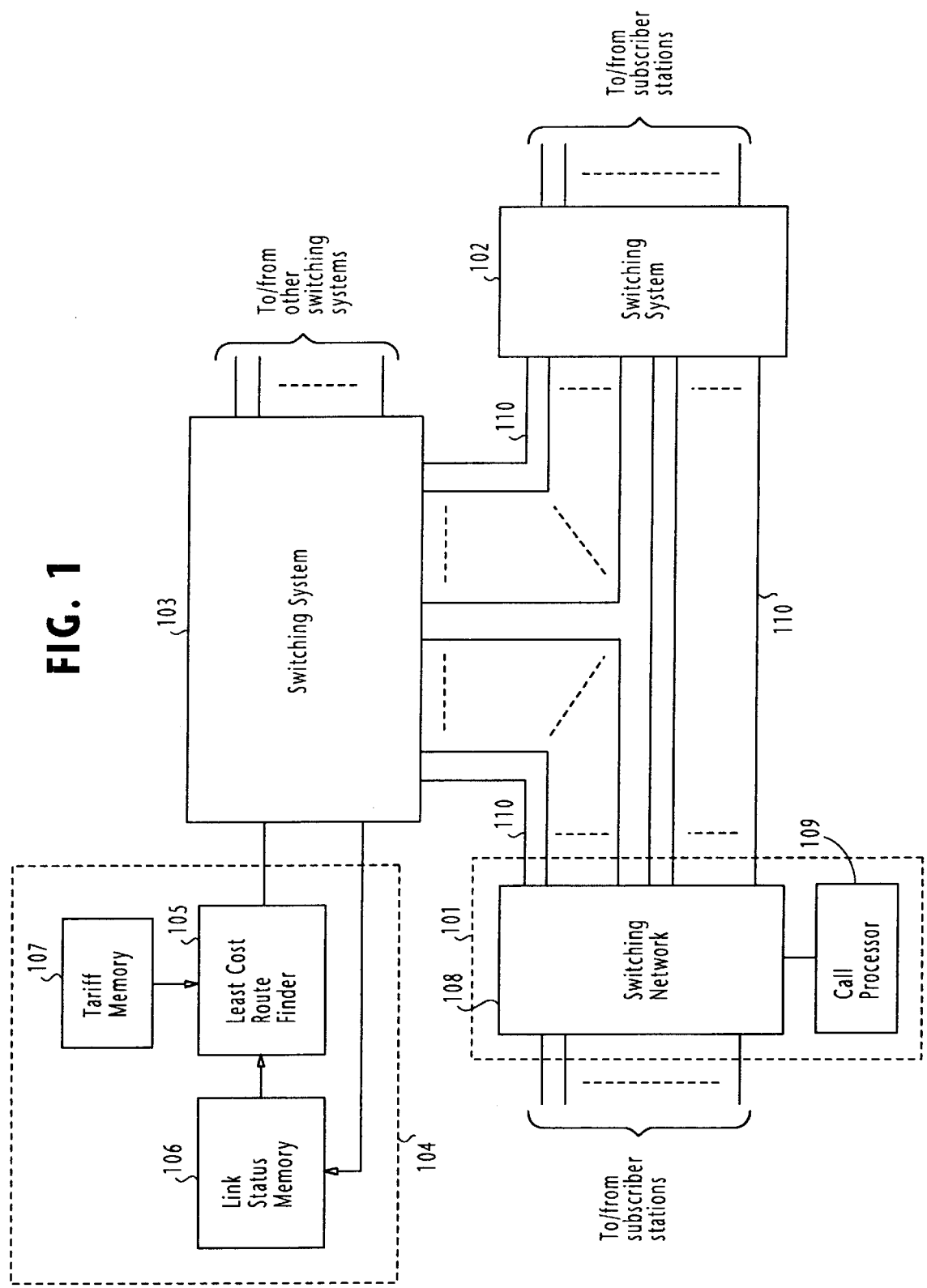
FIG. 1 is a block diagram of a switched communications network according to a first embodiment of the present invention.

In FIG. 1, there is shown a switched communications network according to a first embodiment of the present invention. For the purpose of disclosure, the network is illustrated in simplified form as consisting of three network nodes, or switching systems 101, 102 and 103 interconnected by communication links 110. As one example, the switching systems 101 and 102 function as a local switch for serving subscriber stations and the switching system 103 functions as a transit switch interconnected to remote switching systems.

Switching system 103 is associated with a database 104 which includes a least cost route finder 105, a link status memory 106 and a tariff memory 107. Link status memory 106 contains status data of all links of the network. Switching system 103 has access to the busy/idle status of all links of the network and updates the memory 106 with current status of the links. Tariff memory 107 holds tariff data of all possible routes of the network as calculated from each originating switching system. The contents of the tariff memory 107 are updated by the network provider whenever a revision is made on the cost of each route. Least cost route finder 105 has a built-in route finding algorithm with which it makes a search through the memories 106 and 107 for a least cost route that extends from an originating switching system to a given destination.

Each local switching system has a switching network 108 and a call processor 109 that handles all call requests from subscribers of the system as well as from other switching systems to establish a path in the switching network.

Switching system 103 may include a digital cross-connect system to allow all local switching systems of the network to have a direct access to the database 104.

Figure 2:
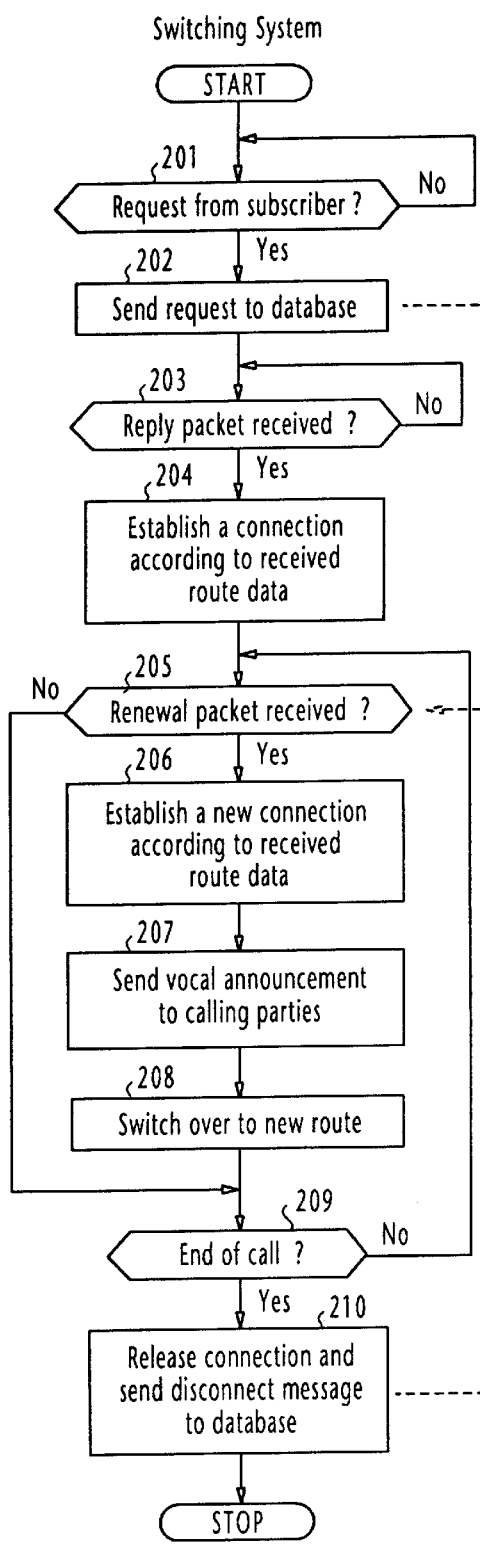
FIG. 2 is a flowchart of the operation of the call processor of each local switching system according to the first embodiment of this invention.
Figure 3:
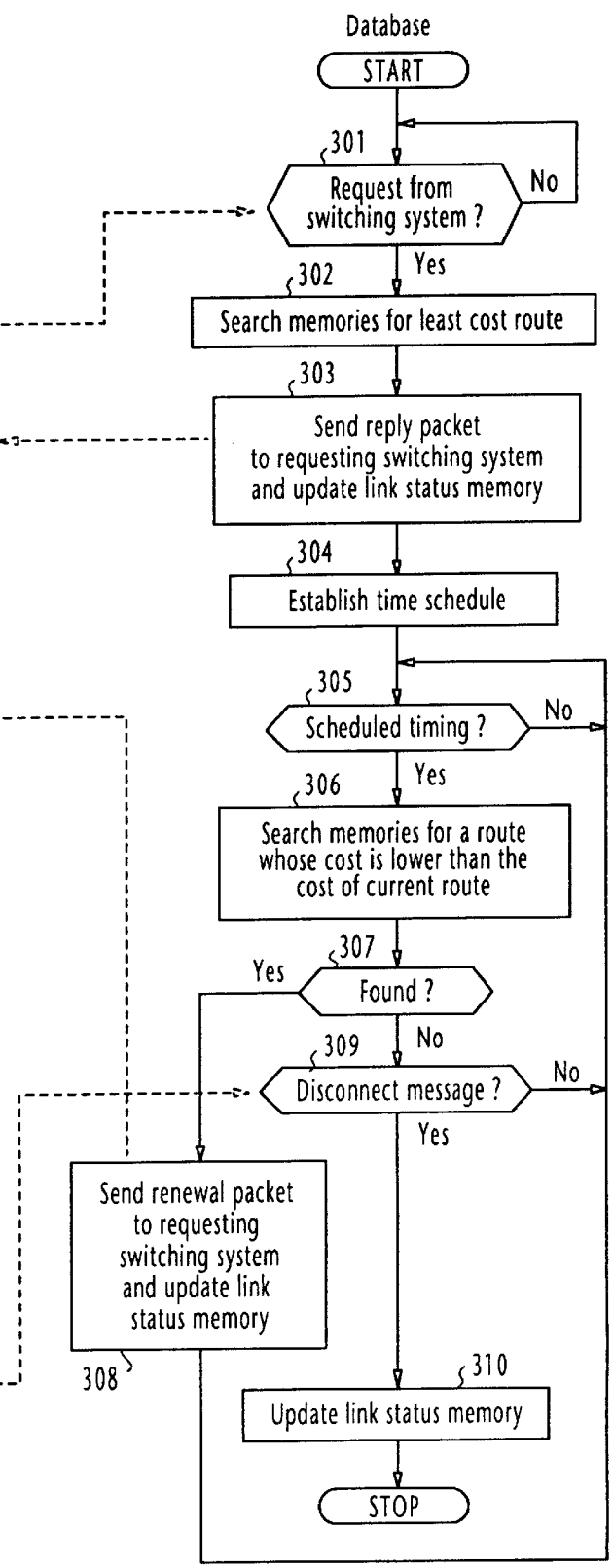
FIG. 3 is a flowchart of the operation of a database according to the first embodiment of this invention.

The operation of the call processor of each local switching system and the database 104 proceeds according to the flowcharts of FIGS. 2 and 3.

The operation of the call processor of each local switching system begins with step 201 when a call request is received from a subscriber of the system. Flow proceeds from step 201 to step 202 to send a request packet to the database 104.

The request packet is then received by the least cost route finder 105 as shown at step 301. In response to the request packet, the least cost route finder 105 proceeds to step 302 to make a search through the memories 106 and 107 for a least cost route that is currently available. The route search is based on information such as day of month, day of week, time of day, and the telephone numbers of the calling and the called subscribers.

At step 303, the least cost route finder sends a reply packet to the requesting switching system, containing data representing the detected least cost route and updates the link status memory 106 so that the detected route can be used exclusively by the requesting subscriber.

On receiving the reply packet at step 203, the requesting switching system proceeds to step 204 to establish a connection to the destination according to the route data contained in the reply packet. Flow proceeds from step 204 to step 205 to check to see if there is a subsequent reply packet from the database 104.

After transmitting the reply packet at step 303, the least cost route finder 105 proceeds to step 304 to establish a time schedule for triggering a search through the memories 106 and 107 for a least cost route at periodic timing, and starts a timer. The timer is checked at step 305 to see if it matches a scheduled instant of time. If scheduled timing occurs, flow proceeds from step 305 to step 306 to make a search through the memories 106 and 107 for a route whose cost is lower than the cost of the current route.

If there is a route whose cost is lower than the cost of the current route (step 307), the least cost route finder 105 proceeds to step 308 to transmit a second reply packet to the requesting switching system containing the newly detected route data and updates the link status memory 106 by marking the new route with a busy indication. Flow returns to step 305 to repeat the process. If there is no route whose cost is lower than the cost of the current route, flow proceeds from step 307 to step 309 to check to see if a disconnect message is received from the originating switching system. If not, flow returns from step 309 to step 305. Otherwise, flow proceeds to step 310 to update the link status memory 106 to restore its contents. Thus, for the duration of a call, steps 305 to 309 are repeatedly executed to search for a route whose cost is lower than the cost of the current route.

In response to a renewal packet which is received at step 205, the originating switching system proceeds to step 206 to establish a new connection to the destination according to the route data contained in the renewal packet and sends a vocal announcement to the calling parties (step 207), indicating that the connection will be switched over to a new route. Then, at step 208, the current route is replaced with the new route and the old route data in the link status memory 106 is marked with an idle indication.

Following the execution of operations step 208 or the execution of decision step 205 indicating that no renewal packet is received from the database, the connection is tested to determine whether the call is still in progress. If the call is still in progress, flow returns from step 209 to step 205. Otherwise, flow proceeds to step 210 to release the current connection and send a disconnect message to the database 104, and the call processor terminates the routine.

On receiving the disconnect message at step 309, the least cost route finder 105 updates the link status memory 106 (step 310) and terminates the routine.

Figure 4:
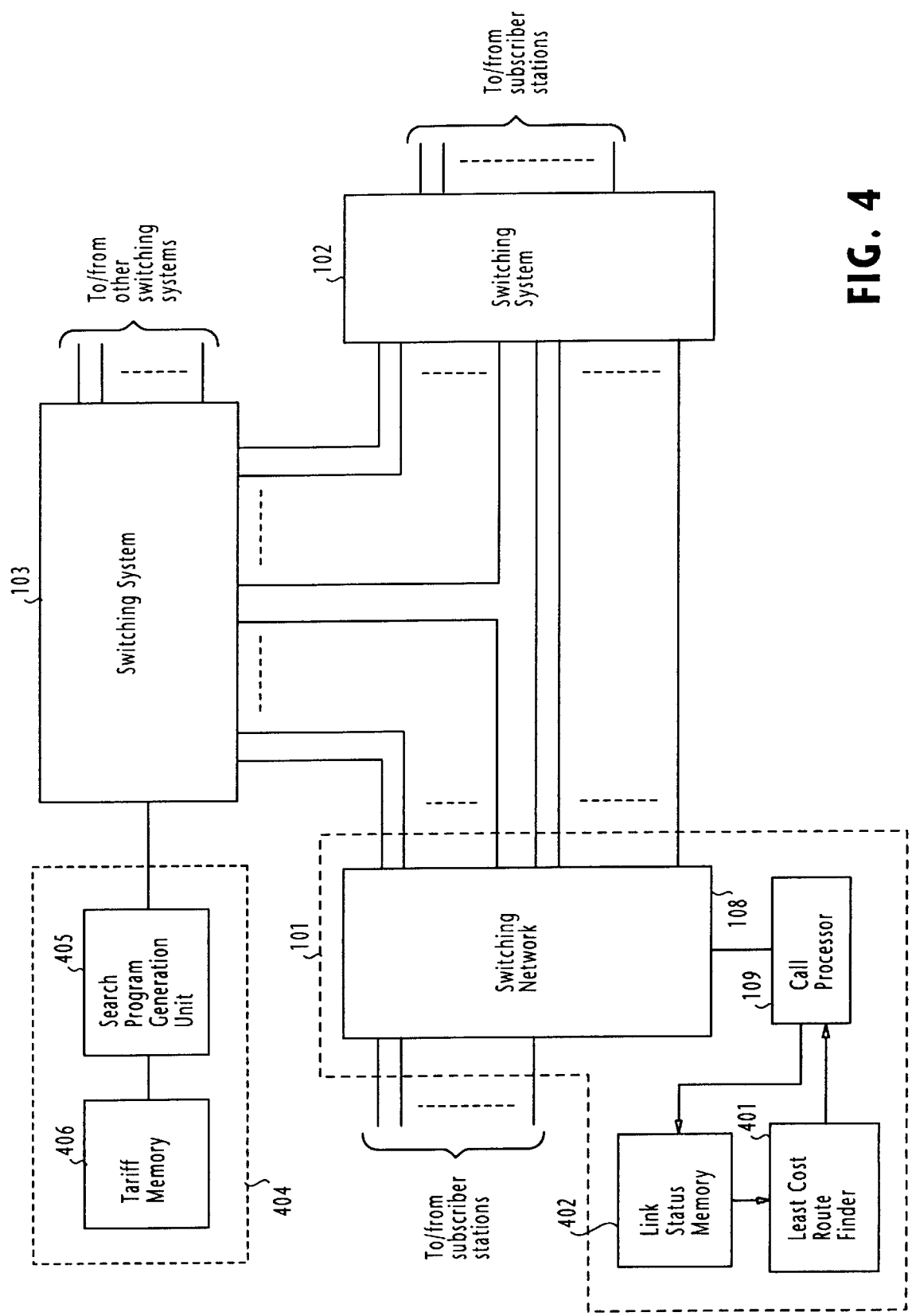
FIG. 4 is a block diagram of a switched communications network according to a second embodiment of the present invention.

A switched communications network according to a second embodiment of this invention is illustrated in FIG. 4. In this embodiment, each local switching system includes a least cost route finder 401 and a link status memory 402. Call processor 109 has access to the busy/idle status of all links available for the subscribers of its switching system and updates the link status memory 402 with current status of the links. Associated with the switching system 103 is a database 404 which includes a search program generation unit 405 and a tariff memory 406. Similar to the previous embodiment, the tariff memory 406 holds tariff data of all possible routes of the network as calculated from each local switching system. The contents of the tariff memory 406 are updated by the network provider whenever tariff revision is made. Search program generation unit 405 produces a number of search program data that reflect the tariff of each local switching system so that each search program is optimized for the particular type of each switching system to make a search for a least cost route. Initially, search program data are transmitted to respective switching systems.

Figure 5:
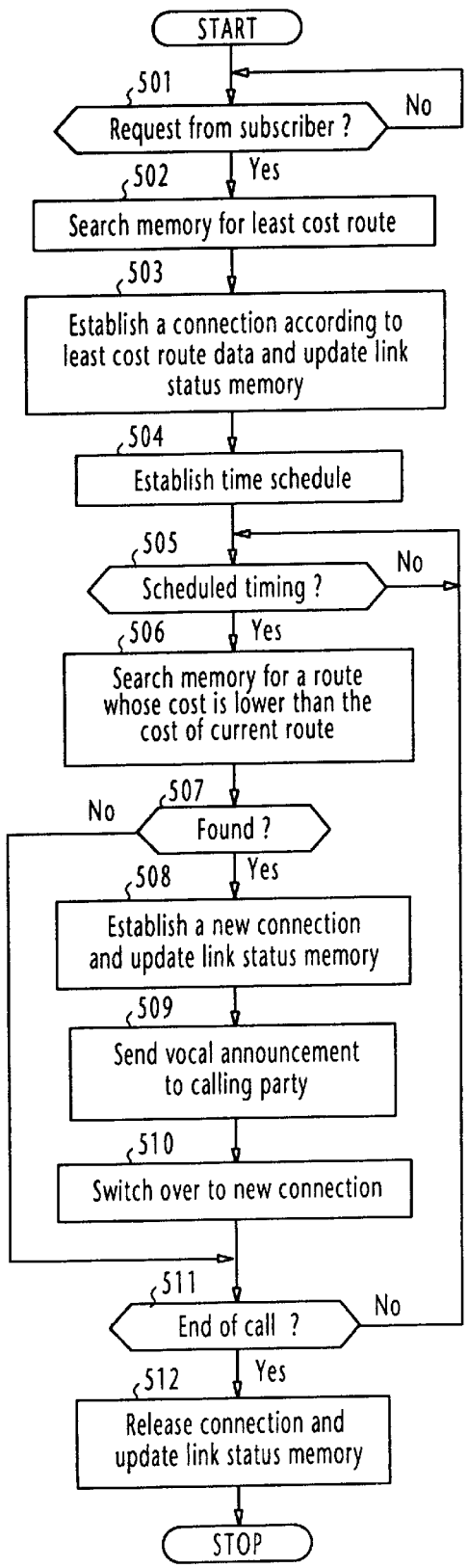
FIG. 5 is a flowchart of the route finding operation of the call processor of each local switching system according to the second embodiment of this invention.
Figure 6:
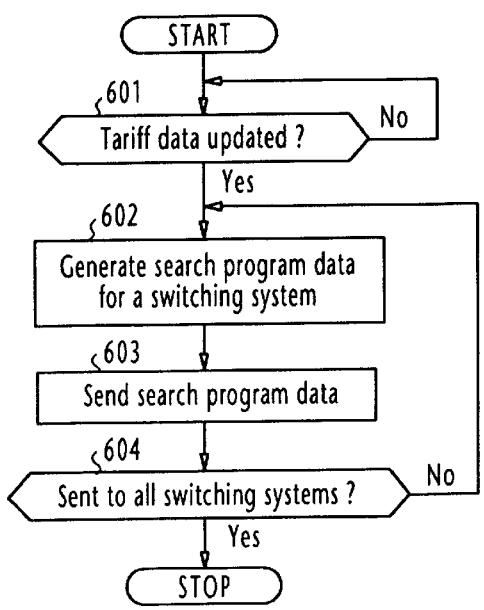
FIG. 6 is a flowchart of the operation of a tariff database according to the second embodiment of this invention when tariff is updated.
Figure 7:
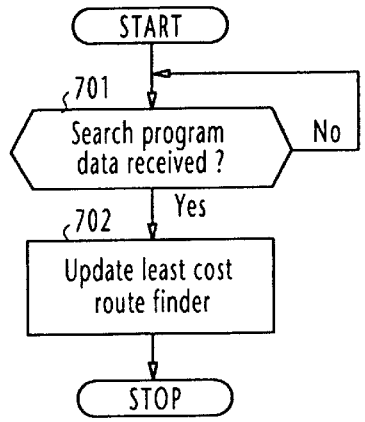
FIG. 7 is a flowchart of the operation of the call processor according to the second embodiment when tariff is updated.

The operation of the least cost route finder 401 of each local switching system and the database 404 proceeds according to the flowcharts of FIGS. 5 to 7.

The operation of the finder 401 of each local switching system begins with step 501 when a call request is received from a subscriber of the system. Flow proceeds from step 501 to step 502 to make a search through the memory 402, using the search program data sent from the database 404, for a least cost route that is currently available. Similar to the previous embodiment, the route search is also based on information such as day of month, day of week, time of day, and the telephone numbers of the calling and the called subscribers.

At step 503, the finder 401 establishes a connection to the destination according to the least cost route data obtained by step 502 and updates the link status memory 402 by marking the detected route with a busy indication. At step 504, the finder 401 establishes a time schedule for periodically searching the memory 402 for a least cost route, and starts a timer. The timer is checked at step 505 to see if it matches a scheduled instant of time. If scheduled timing occurs, flow proceeds from step 505 to step 506 to make a search through the link status memory 402 for a route whose cost is lower than the cost of the current route.

If there is a route whose cost is lower than the cost of the current route (step 507), the route finder 401 proceeds to step 508 to establish a new connection according to the newly determined route and marks the determined route in the link status memory 402 with a busy indication. A vocal announcement is then sent, at step 509, to the calling parties to inform that the connection will be switched over to a new route. Then the connection is switched over to the new route and the link status memory 402 is updated by marking the old route with an idle indication (step 510).

If the decision at step 507 is negative or when step 510 is executed, flow proceeds to step 511 to check for an end-of-call condition. If the call is still in progress, flow returns from step 511 to step 505 to repeat the memory search for a route of still lower cost. If an end-of-call condition is encountered, flow proceeds from step 511 to step 512 to release the connection and updates the link status memory by marking the route data of the released connection with an idle indication.

In FIG. 6, if the tariff data in memory 406 is updated (step 601), the search program generation unit 405 produces updated search program data for a local switching system (step 602) and sends it to that switching system (603). Search program generation unit 405 repeats steps 602 and 603 until updated search programs are sent to all switching systems (step 604). In FIG. 7, the call processor of each local switching system responds to an updated search program sent from the database 404 (step 701) and updates the search algorithm of its lest cost route finder 401 (step 702).

It is seen that in the second embodiment of this invention, the amount of traffic between a call originating switching system and the database is reduced significantly as compared with the first embodiment.

What is claimed is:

1. A method of least cost routing through a communications network, comprising the steps of:
    a) detecting a least cost route through the network in response to a request from a calling subscriber;
    b) establishing a first connection along the least cost route for connecting the calling subscriber and a called subscriber;
    c) detecting a route through the network, said route having a cost lower than the cost of the route detected by the step (a); and
    d) establishing a second connection along the route detected by the step (c) for connecting the calling and called subscribers, instead of via the first connection.

2. The method of claim 1, further comprising the step of sending a vocal announcement to said subscribers before the second connection is established by the step (d).

3. A method of least cost routing through a communications network, comprising the steps of:
    a) detecting a least cost route through a communications network in response to a request from a calling subscriber;
    b) establishing a connection along the least cost route between the calling subscriber and a called subscriber;
    c) making a search through the network for a route having a cost lower than the cost of a previously determined route;
    d) if the route of lower cost is detected by the step (c), establishing a connection along the lower cost route, instead of the currently established connection; and
    e) repeating the steps (c) and (d).

4. The method of claim 3, further comprising the step of sending a vocal announcement to said subscribers before the second connection is established by the step (d).

5. A method of least cost routing through a communications network, comprising the steps of:
    a) making a search through a database for a least cost route in response to a request from a calling subscriber;
    b) establishing a connection along the least cost route between the calling subscriber and a called subscriber;
    c) making a search through the database for a route having a cost lower than the cost of a previously determined route;
    d) if the route of lower cost is detected by the step (c), establishing a connection along the lower cost route, instead of the currently established connection; and
    e) repeating the steps (c) and (d).

6. The method of claim 5, further comprising the step of sending a vocal announcement to said subscribers before the second connection is established by the step (d).

7. A communications network comprising:
    a database for making a first search for a least cost route in response to a request packet and sending a reply packet containing data of said least cost route; and
    a plurality of network nodes interconnected by communication links, each of said network nodes functioning as an originating node for sending said request packet to said database in response to a call request from a calling subscriber, said originating node being responsive to said reply packet for establishing a first connection along the least cost route determined by the database between the calling subscriber and a called subscriber,
    said database making a second search for a route having a cost lower than the cost of said least cost route, and sending a second reply packet containing data of the route of lower cost,
    said originating node being responsive to the second reply packet for establishing a second connection along the route of lower cost, instead of the first connection.

8. The communications network of claim 7, wherein said database is arranged to make said first and second searches based on information including day of month, day of week, time of day, and telephone numbers of said calling and called subscribers.

9. The communications network of claim 7, wherein said originating node is arranged to send a vocal announcement to said subscribers before the second connection is established.

10. A communications network comprising:

a central database for holding tariff data and producing a search program based on the tariff data; and a plurality of network nodes interconnected by communication links, each of said network nodes comprising a local database and functioning as an originating node for making a first search through the local database for a least cost route in response to a call request from a calling subscriber using said search program, and establishing a first connection along the least cost route between the calling subscriber and a called subscriber, said originating node making a second search through the local database for a route having a cost lower than the cost of said least cost route using said search program and establishing a second connection along the route of lower cost, instead of the first connection.

11. The communications network of claim 10, wherein said originating node is arranged to make said first and second searches based on information including day of month, day of week, time of day, and telephone numbers of said calling and called subscribers.

12. The communications network of claim 10, wherein said originating node is arranged to send a vocal announcement to said subscribers before the second connection is established.

13. The communications network of claim 10, wherein said central database is arranged to update said search program when said tariff data is revised.

14. The communications network of claim 10, wherein said central database is arranged to produce a plurality of said search programs respectively adapted for said plurality of network nodes.

* * * * *